(No Model.)
S. SCHEUER.
FASTENER FOR TRAVELING BAGS.
No. 343,609. Patented June 15, 1886.
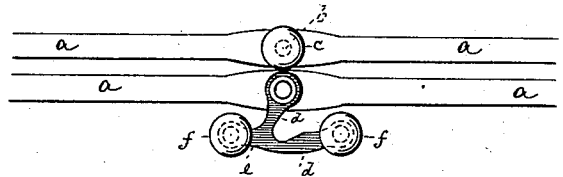
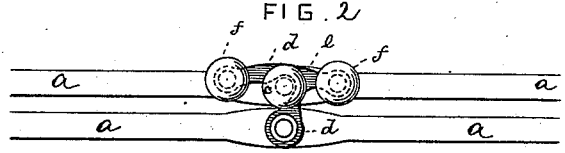
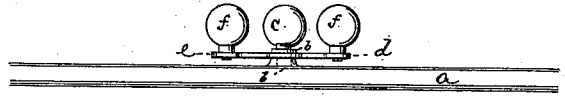
WITNESSES
W. H. Lowe
T. Turner
INVENTOR
Simon Scheuer
by his attorneys
Roeder & Briesen

UNITED STATES PATENT OFFICE.

SIMON SCHEUER, OF NEW YORK, N. Y.

FASTENER FOR TRAVELING-BAGS.

SPECIFICATION forming part of Letters Patent No. 343,609, dated June 15, 1886.

Application filed April 12, 1886. Serial No. 198,592. (No model.)

*To all whom it may concern:*

Be it known that I, SIMON SCHEUER, of the city of New York, county and State of New York, have invented a new and Improved Fastener, of which the following specification is a full, clear, and exact description.

This invention relates to an improvement upon the fastener described in a patent issued to me April 20, 1886, No. 340,252. In that application I have described a fastener consisting of a stationary post carrying a ball, and of a hook-shaped swiveled shank carrying a ball and adapted to embrace the stationary post. I have found that the swiveled shank cannot well be revolved around the fixed post, owing to the fact that it has but one point of contact for the hand to rest against. I have therefore devised a backward extension to such pivoted shank, which is provided with a ball, and which serves as a lever to aid in the revolution of the shank.

In the accompanying drawings, Figure 1 represents a top view of two jaws of a traveling-bag provided with my improved fastener, showing the latter open. Fig. 2 is a similar view showing it closed. Fig. 3 is a side view of the fastener when closed.

The letters $a\,a$ represent the jaws of a traveling-bag, pocket-book, or other article. One jaw carries a fixed catch consisting of a straight upright post, $b$, and ball $c$. To the other jaw there is pivoted a hook, $d$, which is swiveled to its jaw, so as to be free to revolve around its point of attachment. From the hook $d$ there extends backward at about right angles to the hook-shank an arm, $e$, as shown. The hook $d$, as well as the arm $e$, is provided with an upwardly-projecting ball, $f$. When the hook is revolved to embrace post $b$, the catch is closed, as shown in Fig. 2, while when revolved to clear the post the catch is opened, as in Fig. 1. The arm $e$ and its ball, during this operation, serve as a lever and facilitate the operation of the device.

It will be seen that the hook must be revolved one-half of one complete revolution to close the catch, and that when closed all the balls are in line with the jaws of the bag.

I claim as my invention—

The combination of jaws $a$ with post $b$, carrying ball $c$, and with swiveled hook $d$, having arm $e$, carrying balls $f\,f$, all being so constructed that when the catch is closed the balls $c\,f\,f$ are in line with the jaws, substantially as specified.

SIMON SCHEUER.

Witnesses:
ROBT. H. ROY,
ABRAHAM QUITMAN.